(No Model.)
G. H. WENGER.
FISHING FLOAT.
No. 595,664. Patented Dec. 14, 1897.
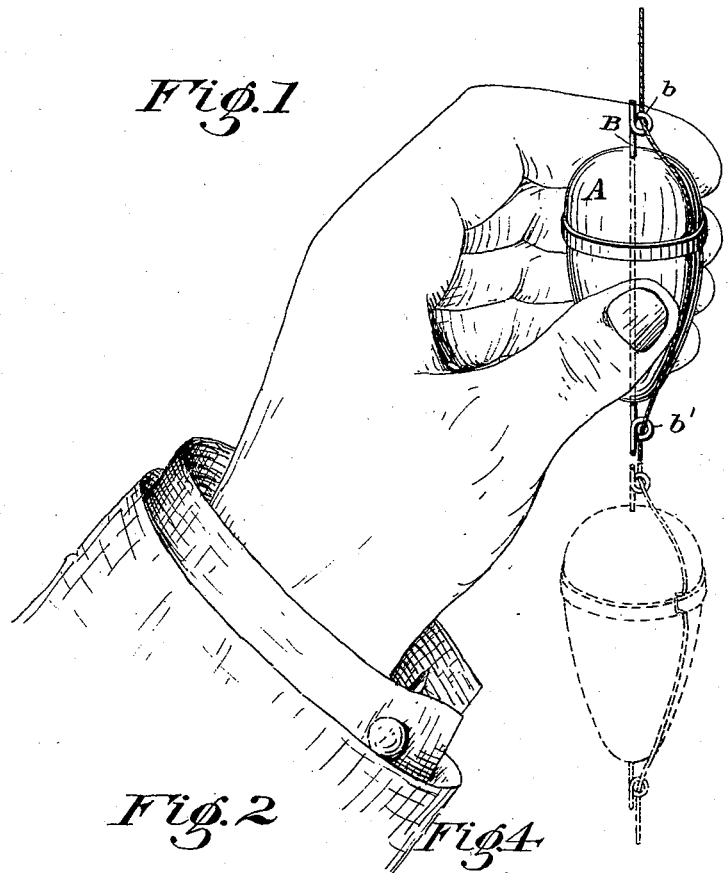
Fig.1
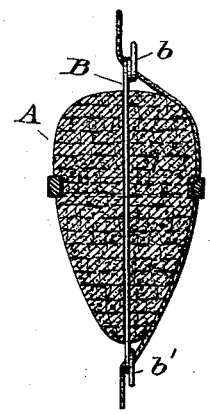
Fig.2
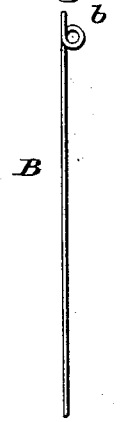
Fig.4
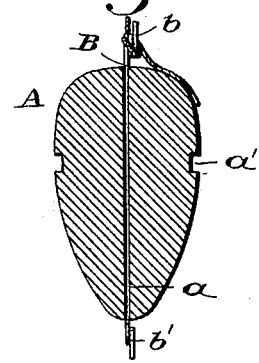
Fig.3
Fig.5
Witnesses:-
B. Krueper
C. H. Schafer.
Inventor:-
Gustav H. Wenger.
By his Atty. C. B. Reichel
THE NORRIS PETERS CO., PHOTO-LITHO., WASHINGTON, D. C.

UNITED STATES PATENT OFFICE.

GUSTAV H. WENGER, OF SOUTH BEND, INDIANA.

FISHING-FLOAT.

SPECIFICATION forming part of Letters Patent No. 595,664, dated December 14, 1897.

Application filed May 17, 1897. Serial No. 636,883. (No model.)

*To all whom it may concern:*

Be it known that I, GUSTAV H. WENGER, a citizen of the United States, residing at South Bend, in the county of St. Joseph and State of Indiana, have invented certain new and useful Improvements in Fishing-Floats, of which the following is a specification.

My invention relates to a float for fish-lines which may be readily adjusted to any position thereon for fishing at any desired depth and securely held in its adjusted position by simple means.

My invention consists in providing the float-body with a guide and lock wire of novel construction in lieu of the quill and ring and also in providing the float-body with an elastic band which will hold the line while the adjustment of the float is being made thereon.

In the accompanying drawings, which illustrate my invention, Figure 1 is a perspective view of my improved float held in the hand while being adjusted upon the line, the full lines representing the float in one position and the dotted lines in a second position thereon; Fig. 2, a vertical section of the float with the line passing freely through the open eyes of the guide and lock wire supported thereon; Fig. 3, a similar view of the float-body with the line passing through the open eyes of the guide-wire and secured to the coils of the upper one of said eyes; Fig. 4, a detail in elevation of the guide-wire in detail before it is passed through the body of the float; Fig. 5, a perspective view of the elastic ring or girdle adapted to fit the body of the float, as will hereinafter appear.

The float-body A is of the usual shape and provided with an axial aperture $a$ to receive the guide-wire B, which is provided with an upper eye $b$, formed of a number of coils made in the wire to lie close together to receive the line. The lower straight end or body of the guide-wire is passed through aperture $a$ in the body A of the float, after which the wire is again coiled several times to provide a lower eye $b'$ thereon below the body of the float, which also receives the line, the latter being allowed to pass freely through both the eyes $b$ and $b'$ of the guide-wire, thus holding the float plumb on the line. An elastic band, preferably of rubber, fits into a circumferential groove $a'$ around the body A of the float at its largest diameter, and the line is passed under said band and held closely pressed to the float-body to prevent the float from sliding down. When the line has been drawn through the eyes of the guide-wire to adjust the float thereon to the required length for fishing, the upper end of the line is drawn between two of the convolutions of the eye, as shown in Fig. 3, thus locking the line on the eye of the guide-wire as securely as though it had been tied with a knot thereon. A very simple and secure connection between the line and the float is thus secured, which will allow the latter to be adjusted quickly and freely thereon and will also provide a simple means for locking the line upon the guide-wire without tying it.

I claim as my invention and desire to secure by Letters Patent—

In a float for fish-lines, in combination with a float-body having a wire extending longitudinally through the same and looped at each end, of a transverse circumferential groove in the body at a point intermediate its length, and an elastic band arranged in the groove, substantially as and for the purpose set forth.

In testimony that I claim the foregoing as my invention I have signed my name in the presence of two subscribing witnesses.

GUSTAV H. WENGER.

Witnesses:
B. KRUEPER,
C. H. SCHAFER.